INVENTOR
LUDGER E. LA BRIE

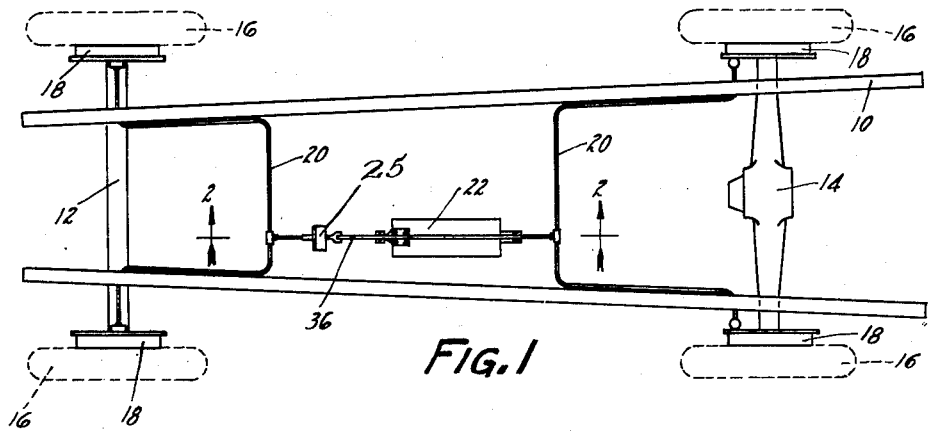

Patented Aug. 23, 1932

1,873,134

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

FLUID-POWER OPERATING MEANS

Application filed November 29, 1926. Serial No. 151,373.

This invention relates to novel means for operating brakes or similar mechanisms by fluid pressure, and is illustrated as embodied in an automobile having brakes on the four wheels operated by the novel fluid-power means. An object of the invention is to provide means of this character so arranged that leakage or breakage in one part of the connections will not render the entire operating mechanism ineffective.

Preferably there are at least two fluid-power devices independently connected to the brakes or their equivalents, with a floating member arranged between the two devices in such a manner as to balance the pressures in them but having its movement definitely limited so that one of the devices can be operated even if the other is broken. In the arrangement shown in the drawings, there is a cylinder assembly including opposed pistons, preferably arranged to compress novel flexible fluid containers, which are arranged to be operated by levers mounted at opposite ends of the assembly. The floating member which balances the pressures is shown as a plunger arranged between the two flexible containers and having a limited movement axially of the cylinder assembly.

Other objects and features of the invention, including various novel combinations of parts and desirable particular constructions, will be apparent from the following description of the illustrative embodiments shown in the accompanying drawings, in which:

Figure 1 is a diagrammatic top plan view of an automobile chassis having brakes operated by the novel power means;

Figure 2 is a section through the power means on the line 2—2 of Figure 1, showing the manner of balancing the pressures;

Figure 3 is a side elevation of the movable plunger, looking in the direction of the arrows 3—3 in Figure 2;

Figure 4 is a top plan view of a modified form of cylinder assembly in which there is a separate device for each of the four brakes;

Figure 5 is a horizontal section through the center of the cylinder assembly of Figure 4;

Figure 6:
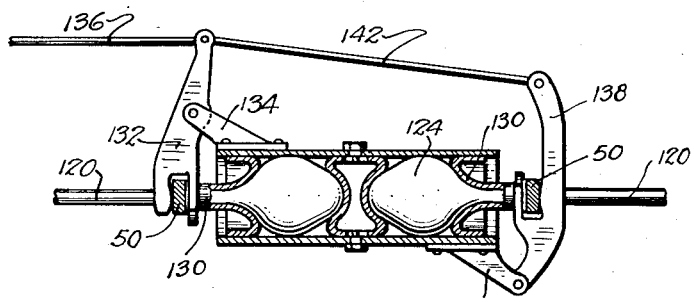
Figure 6 is a section taken on the line 6—6 of Figure 5 indicating in detail the applying means for the fluid containers and Figure 7 is a view similar to Figure 1 indicating a modified form of operator shown in Figure 5.

The automobile chassis illustrated in Figure 1 includes the usual frame 10 supported by axles 12 and 14 having the rotatable wheels 16 provided with brakes 18. The brakes are arranged to be operated by fluid pressure derived from a fluid medium in conduits 20 leading to the brakes from a novel power device 22 operated by a suitable means such as a brake pedal 25.

As shown in Figure 2, the conduits 20 leading respectively from the front and from the rear brakes preferably terminate in flexible compressible fluid containers 24 arranged inside of the cylinder 26 on opposite sides of a floating member such as a plunger 28. Pressure is applied to compress the containers 24 to apply the brakes by means such as pistons 30 having axial passages for the conduits 20 and arranged in opposite ends of the cylinder 26. The piston 30 at the left end of the cylinder is engaged by the lower end of the lever 32 which is fulcrumed between its ends on a bracket 34 carried by the cylinder 26 and which is operated by means such as a link 36 from the brake pedal 25. The piston 30 at the right end of the cylinder is engaged by an intermediate part of the lever 38 which is fulcrumed at its lower end on a bracket 40 carried by the cylinder 26 and which is operated from the pedal 25 by means such as a link or other connection 42 which connects the upper ends of the two levers 32 and 38.

It will be seen that tension on the link 36 will rock the levers 32 and 38 to apply pressure in opposite directions on the pistons 30 to force them toward each other to apply the brakes. Plunger 28 preferably has some movement axially of the cylinder to balance the pressures in the two containers 24, but in order to insure that in case of leakage or breakage on one side of the plunger the brakes on the opposite side may still be applied, I prefer to provide means such as stops 44 projecting into slots 46 in the plunger to limit the movement of the plunger so that in case of such breakage the plunger will be held and it will still be possible to apply one set of brakes.

Figure 7:
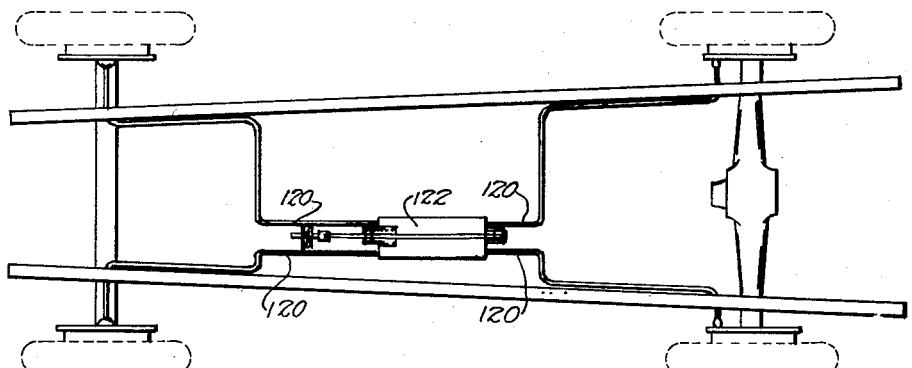

In Figures 4 to 7 is shown a modified arrangement including cylinder assembly 122 having separate operating means for each of the four brakes. In this case there are two cylinders 126 arranged side by side and forming a solid casing and there are four containers 124 communicating with the conduits 120 and operated by four pistons 130. Between the containers 124 in each of the cylinders 126 is arranged a plunger 128 having a limited movement axially of the cylinder the same as described for the plunger 28.

The pistons 130 are operated by levers 132 and 138 which are operatively connected to equalizer bars 50 engaging the pistons, and which are operated by means including a link 136 from the brake pedal to the end of the lever 132 and by a link 142 connecting the ends of the two levers.

While two illustrative embodiments of the invention have been described in detail, it is not my intention to limit the scope of the invention to those particular embodiments or otherwise than by the terms of the appended claims.

I claim:

1. A braking system comprising, in combination, a plurality of fluid-actuated brakes, and a plurality of fluid-power devices for operating said brakes, including flexible compressible fluid containers and a member normally movably arranged between said containers to balance the pressures therein, and means for limiting the movement of said member so that leakage or breakage in one of said devices will not prevent operation of the other device.

2. Fluid-power brake-actuating means comprising, in combination, a pair of fluid-power devices of the expansible and contractible type, operating means for applying pressure to the fluid therein, a member separate from said operating means and arranged to transmit the reaction from each of said devices to the other and movable to balance the pressures in said devices, and means for limiting the movement of said member so that loss of fluid from one of said devices will not prevent operation of the other.

3. Fluid-power brake-actuating means comprising, in combination, a pair of fluid-power devices of expansible and contractible type, operating means for applying pressure to the fluid therein, a member separate from said operating means and arranged between said devices and movable to balance the pressures in said devices, and means for limiting the movement of said member so that loss of fluid from one of said devices will not prevent operation of the other.

4. Fluid-power operating means comprising, in combination, chambers arranged end-to-end and containing a fluid medium, a floating member between said chambers and balancing the pressures therein, means for limiting movement of said member, and means for applying pressure to the opposite ends of said chambers.

5. Fluid-power operating means comprising, in combination, adjacent flexible expansible chambers containing a fluid medium, a floating member between said chambers directly engaging the expansible walls thereof and balancing the pressures therein, means for limiting movement of said member, and means for applying pressure to the fluid medium in said chambers.

6. Fluid-power operating means comprising, in combination, chambers arranged end-to-end and containing a fluid medium, a floating member between the chambers and balancing the pressures therein, inter-connected levers arranged respectively adjacent the opposite ends of the chambers, and pressure-applying members in the opposite ends of said chambers and operated by the corresponding levers.

7. Fluid-power operating means comprising, in combination, chambers arranged end-to-end and containing a fluid medium, a floating member between the chambers and balancing the pressures therein, stops limiting the movement of the floating member, inter-connected levers arranged respectively adjacent the opposite ends of the chambers, and pressure-applying members in the opposite ends of said chambers and operated by the corresponding levers.

8. Fluid-power operating means comprising, in combination, compressible fluid containers adjacent each other and each having an outlet conduit, a member movably arranged between said containers and balancing the pressures therein, and means for applying opposing pressures to said containers in the direction of said member.

9. Fluid-power operating means comprising, in combination, compressible fluid containers adjacent each other and each having an outlet conduit, a member movably arranged between said containers and balancing the pressures therein, and pressure-applying devices having heads engaging the containers and formed with central passages for said conduits.

10. Fluid-power operating means comprising, in combination, a cylinder, an axially-movable plunger in the center of the cylinder, compressible fluid containers in the cylinder on opposite sides of said plunger and having outlet conduits extending out of the ends of the cylinder, and pressure-applying pistons in the ends of the cylinder having axial passages for said conduits.

11. Fluid-power operating means comprising, in combination, a cylinder, an axially-movable plunger in the center of the cylinder, pressure-applying pistons in the ends of the cylinder, and levers mounted on the ends of the cylinder and arranged to operate the pistons toward said plunger.

12. Fluid-power operating means comprising, in combination, a cylinder assembly containing a pair of opposed pistons, a lever fulcrumed between its ends at one end of said assembly and having its inner end engaging one of the pistons, a second lever fulcrumed at one end on said assembly and engaging the other piston and having its end arranged on the same side of the assembly as the second end of the first lever, and operating means including a connection between said ends.

13. Fluid-power means comprising, in combination, a cylinder assembly containing four pistons arranged in two opposed pairs with the corresponding pistons of the different pairs arranged side by side, two equalizer bars, and levers operated by the bars and operable to force the pairs of pistons toward each other.

14. Fluid-power means comprising, in combination, a cylinder assembly containing four pistons arranged in two opposed pairs with the corresponding pistons of the different pairs arranged side by side, two equalizer bars, two pairs of levers operated by the bars, one of the pairs of levers being fulcrumed at their first ends and engaging their pistons between the ends of the levers and the other pair of the levers being fulcrumed between their ends and engaging their pistons at their first ends, and operating means including a connection between the centers of the equalizer bars.

15. A brake system comprising, in combination, a plurality of fluid actuated brakes, and means for actuating said brakes including a compressible fluid container for each brake, the fluid containers for at least two of the brakes being arranged in proximity to each other and having between them means so arranged that the pressure applied to one container reacts through said latter means upon the other container, and means for applying pressure to each container.

16. A brake system comprising, in combination, a plurality of fluid actuated brakes, and means for actuating said brakes including a compressible fluid container for each brake, and means for applying pressure independently to two containers equalized directly through the containers independently of said applying means.

17. A brake system comprising, in combination, a plurality of fluid actuated brakes, and means for actuating said brakes including a fluid container for each brake, means for applying unequalized pressure independently to the fluid in two containers, and means between the containers for balancing the pressures on the fluid in the two containers against each other.

18. A brake system comprising, in combination a plurality of fluid actuated brakes, and means for actuating said brakes including means for each brake terminating in a compressible fluid bulb container, two of said containers being arranged in proximity and being provided with a movably supported member interposed therebetween and so formed as to partially pocket each container, and means directly engaging each container to exert a pressure thereupon to be equalized with the pressure in the other container through said interposed member.

19. Fluid-power operating means comprising cylinder means having two fluid-containing parts and provided between said parts with a pressure-balancing member having a limited degree of motion, and having a pair of piston devices for producing in said parts pressures balanced by said member.

20. Fluid-power operating means comprising cylinder means having two fluid-containing parts and provided between said parts with a pressure-balancing floating piston, and having a pair of operating pistons for producing in said parts pressures balanced by said floating piston.

21. Fluid-power operating means comprising two fluid-container parts having between and separating them a floating pressure-balancing member, means for limiting the floating movement of said member, and means comprising a pair of piston devices for exerting pressure on the fluid in said parts.

22. Fluid-power operating means comprising two fluid-container parts having between and separating them a floating pressure-balancing member, and means comprising a pair of piston devices for exerting pressure on the fluid in said parts.

23. Fluid power operating means comprising, in combination, a cylinder having chambers therein arranged end to end and containing a fluid, a floating member in said cylinder positioned between said chambers and balancing the pressures therein, means for limiting the movement of said member, and means for applying pressure to the fluid in said chambers.

24. A brake system comprising, in combination, a plurality of fluid actuated brakes, means for actuating said brakes comprising a fluid container for each brake, the fluid containers for at least two of said brakes being arranged in proximity to each other, means comprising a plunger interposed between said last named fluid containers so arranged that the fluid pressure applied to one of the containers acts upon said means and through said means reacts upon the fluid pressure in the other said container, and means for applying pressure to each of said containers.

In testimony whereof, I have hereunto signed my name.

LUDGER E. LA BRIE.